Aug. 3, 1965 H. D. STEWART 3,199,007
SWITCHING LOGIC MEANS FOR A TWO-DIGIT THREE POSITION SERVOMOTOR MECHANISM
Filed Jan. 23, 1963
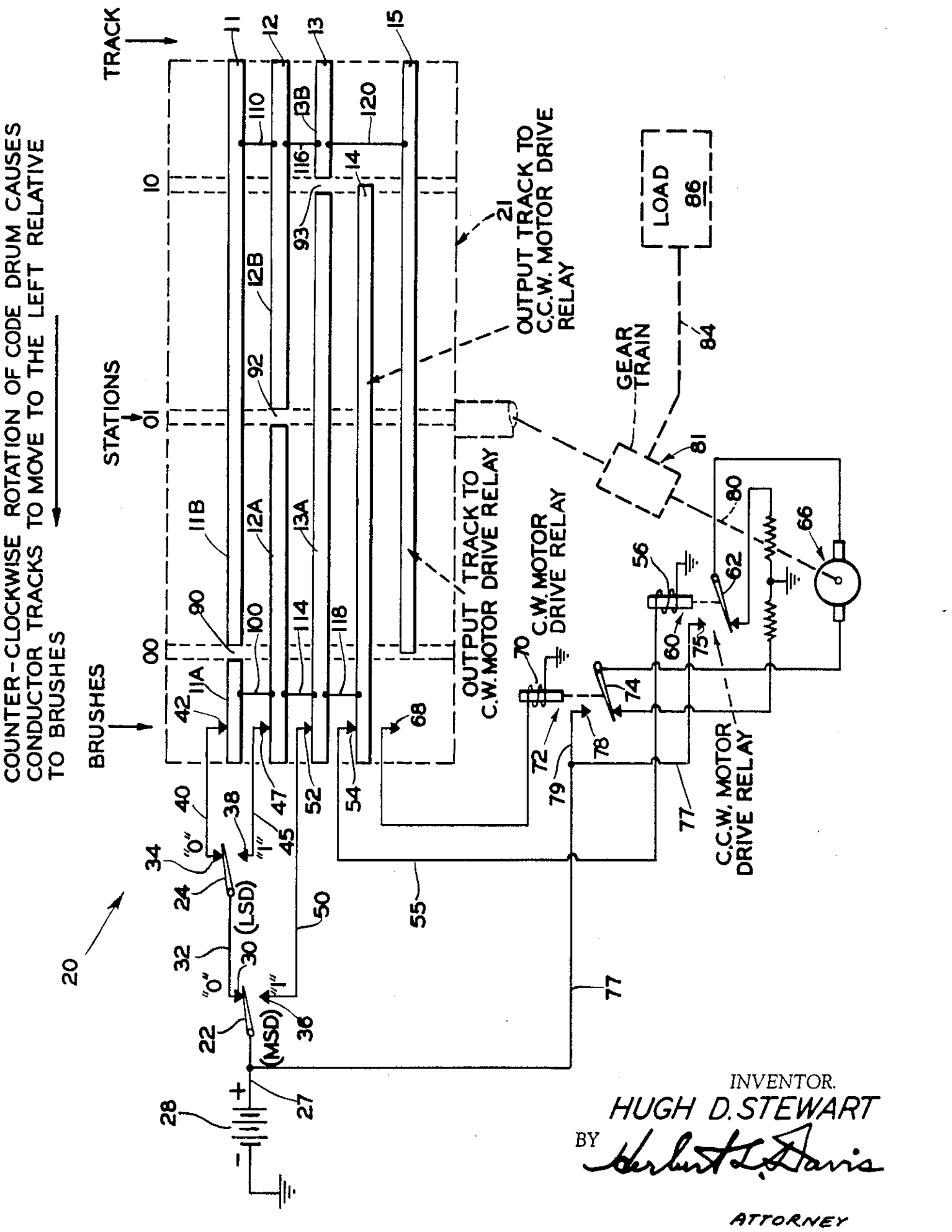
INVENTOR.
HUGH D. STEWART
BY Herbert L. Davis
ATTORNEY United States Patent Office 3,199,007 Patented Aug. 3, 1965

3,199,007
SWITCHING LOGIC MEANS FOR A TWO-DIGIT THREE POSITION SERVOMOTOR MECHANISM

Hugh D. Stewart, Westwood, N.J., assignor to The Bendix Corporation, Teterboro, N.J., a corporation of Delaware Filed Jan. 23, 1963, Ser. No. 253,303
2 Claims. (Cl. 318—33)

This invention relates to improvements in a discrete servomotor mechanism of a type such as disclosed generally in copending U.S. application Serial No. 253,302, filed January 23, 1962, for a switching logic means for a discrete servomotor mechanism, by Harold Moreines and Hugh D. Stewart, and assigned to The Bendix Corporation, assignee of the present invention, and more particularly the invention is concerned with a three discrete position servomotor mechanism including novel means capable of accepting two-digit parallel digital commands, and to novel means for data comparison which permits implementation of the switching logic with a minimum number of information tracks.

An object of the invention is to provide novel means to obtain discrete servo position data from a code drum having a set of brush contacts cooperating with suitable conductor tracks carried by the drum.

Another object of the invention is to provide a novel discrete servomechanism whereby possible command servo conditions may be effected which are not contiguous but which positions are separated by guard zones which are inadmissible as steady-state servo positions.

Another object of the invention is to provide a novel code drum operably connected so that two binary digits may effect three discrete positions of the code drum, the extreme positions being designated, the zero position (corresponding to the binary command of 00), and the third position (corresponding to the binary number 10), and in which arrangement of the code drum angular adjustment thereon beyond the extreme positions is limited by electrical stops so provided as to prevent overtravel of control brushes cooperating therewith.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawing:

The drawing is a schematic diagram of a switching system embodying the invention and showing the interconnections between the digit command switches and the controlled servomechanism operatively connected to the coded drum in which the conductor tracks and cooperating brushes are shown in cooperative relation.

Referring to the drawing, there are shown three basic information conductor tracks indicated by the numerals 11–13 for effecting control of the two-digit servomechanism, indicated generally in the drawing by the numeral 20 and two output conductor tracks indicated by the numerals 14 and 15. The tracks are carried by a rotatable insulation drum 21.

It will be seen from the foregoing drawing that the means of implementation of the control system which is used for illustration purposes includes a set of command signals in the form of binary coded digits "0" and "1" implemented by means of suitable control switches 22 and 24.

In such arrangement, the most significant digit (MSD) command switch is indicated by the numeral 22, while the least significant digit (LSD) command switch is indicated by the numeral 24. The command switches 22 and 24 are shown in the so-called "zero" command condition.

The switch 22 is electrically connected through a conductor 27 to a suitable source of electrical energy 28. The switch 22 is arranged to close a control contact 30 in the so-called "0" (MSD) command condition while the contact 30 is connected by a conductor 32 to the switch 24 which is arranged to close contact 34 in the so-called "0" (LSD) condition. Further, the switch 22 is arranged to selectively open the contact 30 and close a second contact 36 in the so-called "1" (MSD) command condition while the switch 24 is arranged to selectively open a contact 34 and close a second contact 38 in the so-called "1" (LSD) command condition.

The switch contact 34 is connected by electrical conductor 40 to a brush 42 cooperatively arranged in relation to the conductor tracks 11A and 11B. The switch contact 38 is connected by electrical conductor 45 to a brush 47 cooperatively arranged in relation to conductor tracks 12A and 12B. Contact 36 is connected by an electrical conductor 50 to a brush 52 arranged in cooperative relation with tracks 13A and 13B.

Further output track 14 has cooperatively arranged in relation thereto a brush 54 electrically connected by a conductor 55 to an electromagnetic winding 56 of a relay 60 controlling a relay switch 62 for in turn controlling rotation of a servomotor 66 in a counterclockwise direction. Further, the output conductor track 15 is arranged in cooperative relation to a brush 68 electrically connected to an electromagnetic winding 70 of a relay 72 controlling the relay switch 74 for controlling rotation of the servomotor 66 in a clockwise direction.

In the aforenoted arrangement, it will be seen that, upon energization of the relay switch 60, a switch arm 62 is biased upwardly so as to close a switch contact 75 operatively connected through a conductor 77 with a source of electrical energy 28 and so arranged that, upon closure of the switch contact 75, the motor 66 is driven in a counterclockwise direction.

Similarly, closure of a switch contact 78 by switch arm 74 upon energization of the relay 72 connects the source of electrical energy 28 through conductors 77 and 79 to the motor 66 so as to effect rotation of the motor 66 in a clockwise direction.

The servomotor 66, as shown in the drawing, drives through a shaft 80 and gear train 81 the novel coded drum 21 and in turn through a shaft 84 a load or object 86 to be adjustably positioned to the three discrete positions provided by the conductor tracks 11–13 on the drum 21, as shown in greater detail in the drawing.

In the arrangement of the several conductor tracks 11, 12, and 13 provided on the code drum 21, there is a space 90 between the tracks 11A and 11B; a space 92 between the tracks 12A and 12B; and a space 93 between the tracks 13A and 13B which provide a break-before-make relationship in the travel of the cooperating brushes 42, 47, and 52, respectively, on the tracks 11, 12 and 13.

In the arrangement of the several controlled conductor tracks of the drawing, the track 11A is connected by a conductor 100 to the conductor track 12A; the conductor track 11B is connected by a conductor 110 to the conductor track 12B. Further, the conductor track 12A is connected by conductor 114 to the conductor track 13A while the conductor track 12B is connected by a conductor 116 to the conductor track 13B.

Also, it will be seen that the conductor track 13A is connected by a conductor 118 to the counterclockwise output conductor track 14 while the conductor track 13B is connected by a conductor 120 to the clockwise output conductor track 15.

In the aforenoted arrangement shown in the drawing, it will be seen that the spaces 90, 92, and 93, between the several contact tracks indicated by the respective numerals 11A–11B; 12A–12B; and 13A–13B provide the three discrete positions of the coded drum 21 effecting the several stations for the digital commands 00, 01, and 10.

Operation of the switching logic is as follows:

The zones are arranged so that the commands are traversed in sequence by a counterclockwise direction of rotation of the coded drum 21 from the lowest binary command 00 to the highest binary command 10. The excitation voltage is applied through the most significant (MSD) command contact switch 22. All command contact switches 22 and 24 are shown in the "0" command condition.

In the aforenoted three digit position servo system, the binary digits "0" normally provide a controlling action of two squared or four positions. However, in the present invention, only three of these positions are used in that the zero position shown corresponds to the binary command "00," the first position corresponds to binary command "01," and the second position corresponds to binary command "10." The binary command "11" is not used. Corresponding to the numbered commands are the three adjoining zones. Further, located within each zone is the commanded station or discrete position 90, 92, or 93 having an angular width corresponding to the desired positioning accuracy.

In the aforenoted arrangement in which only three admissible commands out of the four possible binary commands have been utilized, the arrangement of the two command switches 22 and 24 have been such as to provide a three output translator network. This results in a significant simplification of switching over that required by a sequential digit comparison technique. In addition, it allows the switching logic to operate the driving means directly to the desired discrete position. When the servomechanism reaches the command position, all motive power is removed and suitable braking means of conventional type may be applied to stop the servomechanism within the desired tolerances.

In the drawing, there is shown a schematic diagram of the switching system which includes a developed view of the code drum information tracks 11, 12 and 13. The present means of implementation includes relays 60 and 72 for providing motor power switching. However, the information is not limited to such means but permits semiconductor switches or other means for achieving motor drive. Braking action may be achieved by a solenoid operated friction brake or by electrically short-circuiting the motor armature for dynamic braking.

In the operation of the device with the most significant digit (MSD) contact switch 22 in the "0" position and the least significant (LSD) command switch 24 in the downward position or so-called "1" position closing contact 38, it will be seen that with the contact switches in these positions, should the servo position be such that the commands are unsatisfied, contact will be made through conductor tracks 12A and 14 to the counterclockwise motor drive relay 60 when the servo position is to the left or clockwise from the command position or through tracks 12B or 15 to the clockwise motor relay 70 when the servo position is to the right or counterclockwise from the commanded position. When the servo reaches the commanded position, the circuit is broken by the gap 92 in track 12 corresponding to the discrete position "01" as commanded whereupon power is removed from the driving relay 60 or 70 as the case may be.

Positioning to either of the two other possible binary command positions "00" or "10" is similarly accomplished. Output tracks 14 and 15 are required to provide conductive paths from the code drum to the motor drive relays 60 and 72. Each of these tracks is terminated within the end position corresponding to the direction of travel of the servo which its associated relay commands and thus also functions as an electrical limit switch limiting rotation of the code drum 21.

It will be seen then from the foregoing, that there has been provided novel means for automatically positioning a two-digit, three position servomechanism in response to a binary coded parallel digit command. Furthermore, the switching logic provides a motor torque such as to satisfy input commands directly without torque interruption or reversal. Further, the switching logic is such as to minimize the number of information tracks required to accomplish the desired function thus contributing to improved system reliability. It will be further seen from the aforenoted system that full motor torque is applied when the servomechanism is not at the desired position and the motor power is completely removed when the servo is at the desired position thus providing positive positioning tolerances regardless of load friction.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A position control means for a movable object, said control means comprising in combination, a reversible motor, first means for controlling clockwise rotation of the motor, second means for controlling counterclockwise rotation of the motor, a drum rotatably positioned by the motor, a first pair of conductor tracks carried by the drum, a first brush cooperatively arranged in relation to the first pair of conductor tracks and arranged so as to selectively make contacting relation with one and then the other of said first pair of conductor tracks upon rotation of the drum in one sense, a second pair of conductor tracks carried by the drum, a second brush arranged in cooperative relation with said second pair of conductor tracks and arranged to selectively make contacting relation with one and then the other of said second pair of conductor tracks upon rotation of the drum in said one sense, a third pair of conductor tracks carried by the drum, a third brush arranged in cooperative relation with said third pair of conductor tracks and arranged to selectively make contacting relation with one and then the other of said third pair of conductor tracks upon rotation of the drum in said one sense, a first output conductor track carried by the drum, a first output brush arranged in cooperative relation with the first output conductor track and electrically connected to the first means for controlling clockwise rotation of the motor, a second output conductor track carried by the drum, a second output brush arranged in cooperative relation with the second output conductor track and electrically connected to the second means for controlling counterclockwise rotation of the motor, said first output conductor track being electrically connected to said one track of said first, second, and third pairs of conductor tracks, and the second output conductor track being electrically connected to said other track of said first, second, and third pairs of conductor tracks, a first operator-operative switch, said first switch being selectively operable in one sense to apply electrical energy to the first brush, said first switch being selectively operable in another sense to apply electrical energy to the second brush, a second operator-operative switch, said second switch being selectively operable in one sense to apply electrical energy to said first switch, said second switch being selectively operable in another sense to apply electrical energy to said third brush, means for electrically connecting a source of electrical energy to the second operator-operative switch, the first pair of conductor tracks including therebetween a first insulated portion, the second pair of conductor tracks including therebetween a second insulated portion, and the third pair of conductor tracks including therebetween a third insulated portion, said first, second, and third insulated portions being arranged sequentially in spaced relation, the first, second, and third brushes cooperating with the aforesaid insulated portions in effecting selected positions of the movable object, the selected position of the movable object being effected by that one of the insulated portions determined by the selected positions of the first and second operator-operative switches.

2. A position control means for effecting three discrete positions of a movable object, said control means comprising in combination, a reversible motor, first relay means for controlling clockwise rotation of the motor, second relay means for controlling counterclockwise rotation of the motor, a drum rotatably positioned by the motor, a first pair of conductor tracks carried by the drum, a first brush cooperatively arranged in relation to the first pair of conductor tracks and arranged so as to selectively make contacting relation with one and then the other of said first pair of conductor tracks upon rotation of the drum in one sense, a second pair of conductor tracks carried by the drum, a second brush arranged in cooperative relation with said second pair of conductor tracks and arranged to selectively make contacting relation with one and then the other of said second pair of conductor tracks upon rotation of the drum in said one sense, a third pair of conductor tracks carried by the drum, a third brush arranged in cooperative relation with said third pair of conductor tracks and arranged to selectively make contacting relation with one and then the other of said third pair of conductor tracks upon rotation of the drum in said one sense, a first output conductor track carried by the drum, a first output brush arranged in cooperative relation with the first output conductor track and electrically connected to the first means for controlling clockwise rotation of the motor, a second output conductor track carried by the drum, a second output brush arranged in cooperative relation with the second output conductor track and electrically connected to the second means for controlling counterclockwise rotation of the motor, said first output conductor track being electrically connected to said one track of said first, second, and third pairs of conductor tracks, and the second output conductor track being electrically connected to said other track of said first, second, and third pairs of conductor tracks, a first operator-operative switch, said first switch being selectively operable in one sense to apply electrical energy to the first brush, said first switch being selectively operable in another sense to apply electrical energy to the second brush, a second operator-operative switch, said second switch being selectively operable in one sense to apply electrical energy to said first switch, said second switch being selectively operable in another sense to apply electrical energy to said third brush, means for electrically connecting a source of electrical energy to the second operator-operative switch, the first pair of conductor tracks including therebetween a first insulated portion, the second pair of conductor tracks including therebetween a second insulated portion, and the third pair of conductor tracks including therebetween a third insulated portion, said first, second, and third insulated portions being arranged sequentially in spaced relation, the first, second, and third brushes cooperating with the aforesaid insulated portions in effecting selected positions of the movable object, the selected position of the movable object being effected by that one of the insulated portions determined by the selected positions of the first and second operator-operative switches corresponding to two binary digits to effect the three discrete positions of the movable object.

References Cited by the Examiner

UNITED STATES PATENTS

| | | |
|---|---|---|
| 2,676,289 | 4/54 | Wulfsberg et al. |
| 2,823,344 | 2/58 | Ragland. |
| 2,823,345 | 2/58 | Ragland et al. |
| 3,017,557 | 1/62 | Amato. |

JOHN F. COUCH, *Primary Examiner.*